United States Patent [19]

Payne et al.

[11] Patent Number: 4,945,988

[45] Date of Patent: Aug. 7, 1990

[54] APPARATUS AND PROCESS FOR REMOVING VOLATILE CONTAMINANTS FROM BELOW GROUND LEVEL

[75] Inventors: Frederick C. Payne; Jerry B. Lisiecki, both of Charlotte, Mich.

[73] Assignee: Midwest Water Resource, Inc., Charlotte, Mich.

[21] Appl. No.: 424,983

[22] Filed: Oct. 23, 1989

[51] Int. Cl.$^5$ .................. E21B 43/40; E02D 3/00
[52] U.S. Cl. ................... 166/266; 166/267; 166/268; 166/370; 405/128; 405/258; 210/901; 210/922
[58] Field of Search .......... 166/246, 265–268, 166/305.1, 369, 370; 405/52, 74, 128, 258; 210/901, 922, 923

[56] References Cited

U.S. PATENT DOCUMENTS

| | | | |
|---|---|---|---|
| 4,183,407 | 1/1980 | Knopik | 166/370 |
| 4,323,122 | 4/1982 | Knopik | 166/369 |
| 4,593,760 | 6/1986 | Visser et al. | 166/370 |
| 4,660,639 | 4/1987 | Visser et al. | 166/370 |
| 4,730,672 | 3/1988 | Payne | 166/369 |
| 4,745,850 | 5/1988 | Bastian et al. | 405/258 |
| 4,765,902 | 8/1988 | Ely et al. | 166/246 |
| 4,832,122 | 5/1989 | Corey et al. | 166/266 |
| 4,848,460 | 7/1989 | Johnson, Jr. et al. | 166/266 |
| 4,849,360 | 7/1989 | Norris et al. | 405/258 |
| 4,850,745 | 7/1989 | Hater et al. | 405/258 |

*Primary Examiner*—Bruce M. Kisliuk
*Attorney, Agent, or Firm*—Thomas J. Dodd

[57] ABSTRACT

A process for removing and disposing of or neutralizing volatile contaminants existing in the vadose zone of earth and also in a below ground aquifer. The process includes the injection of substantially oxygen free air into the aquifer to retard the formation of aerobic bacteria and injection of oxygen rich air into the vadose zone to stimulate bacterial growth which aids contaminant recovery. Volatilized contaminants are pulled out of the soil through withdrawal wells which terminate in the vadose zone.

6 Claims, 1 Drawing Sheet

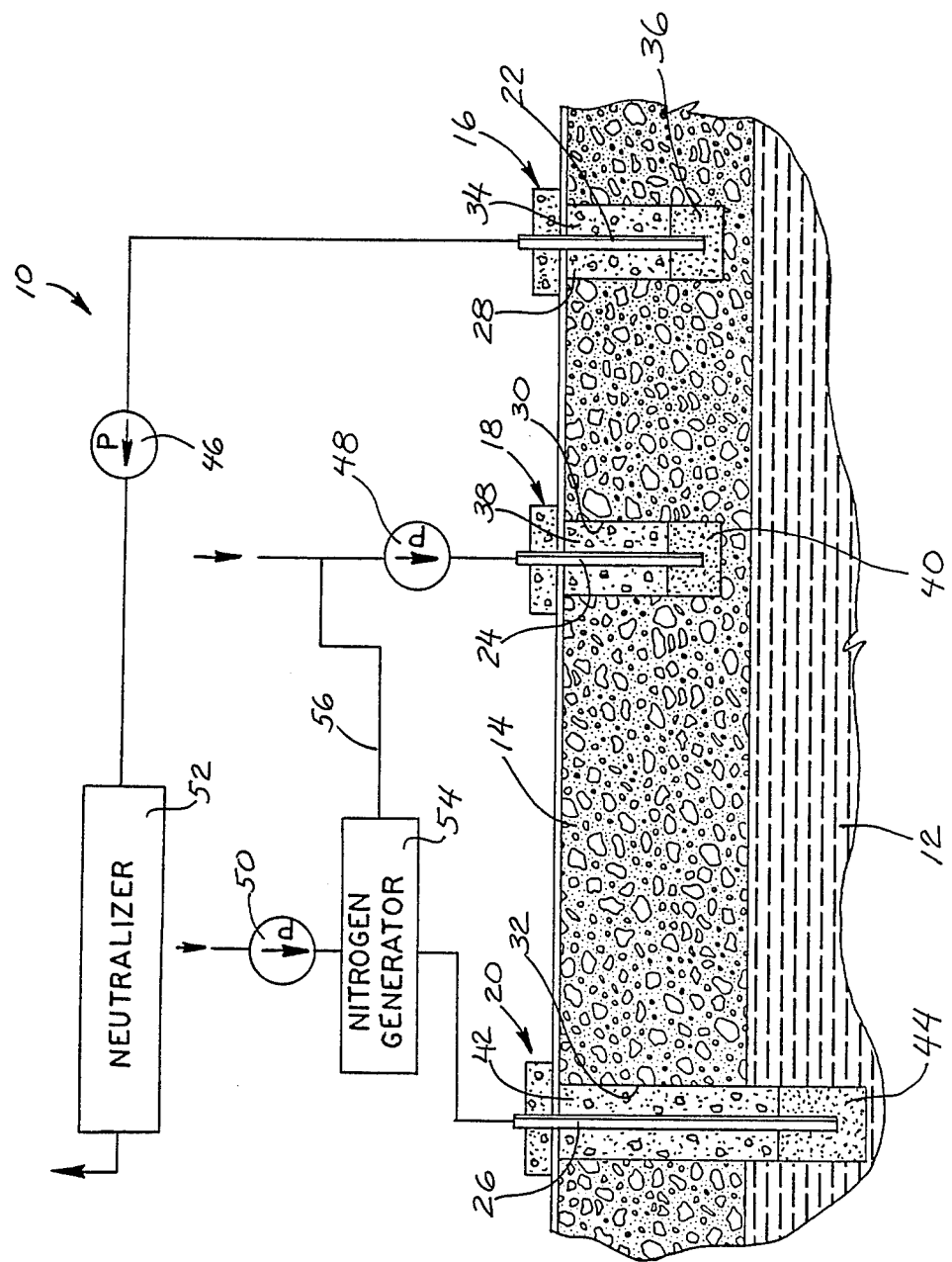

APPARATUS AND PROCESS FOR REMOVING VOLATILE CONTAMINANTS FROM BELOW GROUND LEVEL

FIELD OF THE INVENTION

This invention relates to soil and aquifer decontamination and will have application to removal of volatile contaminants from both the vadose zone and aquifer.

BACKGROUND OF THE INVENTION

Most prior processes for decontaminating soils have concentrated their efforts on removing the contaminants from the vadose zone above the aquifer. Such processes are seen in U.S. Pat. Nos. 4,593,760; 4,660,639; and 4,730,672; and involve injection of air into the vadose zone to urge the contaminants toward a withdrawal well.

A process for removing contaminants from the aquifer itself is shown in U.S. Pat. No. 4,183,407 and in pending patent application Ser. No. 151,065, filed Feb. 1, 1988 now U.S. Pat. No. 4,809,673. The process disclosed in the pending application teaches the injection of atmospheric air into the aquifer to urge the contaminant out of the aquifer and into the vadose zone toward the withdrawal well. This process is commonly referred to as sparging. One major drawback to sparging is the stimulation of bacterial growth or the formation of ignorganic precipitates in the aquifer saturated zone or by injection of oxygen thereinto.

SUMMARY OF THE INVENTION

The sparging process and apparatus of this invention reduces or eliminates the stimulation of bacterial growth in the aquifer by reducing or eliminating oxygen from the atmospheric air injected into the aquifer. This is accomplished by placing an oxygen separator commercially known as a nitrogen generator along the conduit lines leading to the aquifer downstream of the air pump.

The oxygen thus separated may be either discharged back into the atmosphere or may be transferred to a separate conduit which terminates in the vadose zone. If so transferred, the additional oxygen in the vadose zone provides additional stimulation of bacterial growth in this zone to assist in recovery and removal of contaminants present therein. The contaminants are then removed through a conventional vapor withdrawal well and neutralized or otherwise disposed of.

BRIEF DESCRIPTION OF THE DRAWING

FIG. 1 is a schematical representation of the apparatus of this invention.

DESCRIPTION OF THE PREFERRED EMBODIMENT

The preferred method and apparatus described are not intended to be exhaustive or to limit the invention to the precise form or steps disclosed. They are chosen and described to illustrate the principles of the invention so that others skilled in the art may utilize its teachings.

Referring to FIG. 1, reference numeral 10 generally designates a simplified apparatus, shown in schematic form, for removing volatile contaminants from a below ground aquifer 12 and vadose zone 14. Apparatus 10 generally includes air withdrawal well 16, air injection well 18 and air sparging well 20. Any number of wells 16, 18 and/or 20 may be incorporated at a job site depending upon the amount of contaminated soil to be cleaned.

Conduits 22, 24, 26 are positioned in each borehole 28, 30, 32, respectively, in wells 16, 18, 20. Each conduit 22-26 is surrounded by packing material layers 34, 36, 38 and 40, 42, 44, respectively, as taught in U.S. Pat. No. 4,730,672, which is incorporated herein by reference.

Blower means, illustrated as air pumps 46, 48, 50, are connected in flow communication along a respective conduit 22, 24, 26. A contaminant neutralizer 52 is connected downstream of air pump 46 and serves to neutralize or otherwise destroy the contaminants before the process air is vented to the atmosphere or reinjected into the soil or aquifer. Two acceptable neutralizers 52 include an activated carbon bed or a thermal burner, with others obvious to one skilled in this art. Pumps 48, 50 may draw air in from the atmosphere, or may be connected to conduit 22 to form a closed-loop apparatus.

Apparatus 10 also includes a separator, shown as a nitrogen generator 54, in flow communication along conduit 26 downstream of pump 50. Nitrogen generator 54 is a commercially available item which filters the majority of oxygen out of ambient air and passes the nitrogen and other non-oxygenated elements through. A conduit 56 may be connected between generator 54 an pump 48 to transfer oxygen from the nitrogen generator to conduit 24.

Apparatus 10 is used to remove the volatile contaminants from aquifer 12 an vadose zone 14 as follows. Withdrawal well borehole 28 and air injection bore hole 30 terminate in vadose zone 14 above aquifer 12 and conduits 22, 24 and packing material 34, 36, 38, 40 inserted as described in U.S. Pat. No. 4,730,672. Sparging borehole 32 terminates in aquifer 12 with conduit 26 extending into the aquifer. It should be noted that site stratigraphy and the zone of contamination will determine the number and configuration of wells 16, 18, 20 which must be established, with the simplified schematic drawing shown illustrating the principles and operation of a single type of each well.

After the wells 16, 18, 20 are established, pumps 46, 48, 50 are activated. Pumps 48 may be eliminated if pressure in the nitrogen generator is sufficient to pull in atmospheric air and deliver it to the conduit 24. Pumps 48, 50 draw air from the atmosphere and urge the air through contaminants toward borehole 28. Pump 46 creates an area of reduced pressure about the lower end of conduit 22 to volatize the contaminants and to draw the air and entrained contaminants out of vadose zone 14 and deliver them to neutralizer 52. This process is described in detail in U.S. Pat. No. 4,730,672.

Nitrogen generator 54 reduces oxygen from the air being pumped to aquifer 12. With the air being pumped into aquifer 12 substantially oxygen free, stimulation of aerobic bacterial growth in the aquifer is prevented or reduced, while the pumping of oxygen enriched air into vadose zone 14 stimulates such bacterial growth to aid in the destruction of some contaminants found in the vadose zone.

It is understood that the invention is not limited to the details above-given, but may be modified within the scope of the following claims.

We claim:

1. Apparatus for removing volatile contaminants located below ground level, said apparatus cmprising a withdrawal well terminating in a vadose zone above a below ground aquifer, a first conduit positioned in said withdrawal well and extending upwardly of ground level, first blower means positioned in flow communication along said first conduit for pumping air and volatile contaminants out of said vadose zone, a second conduit positioned in a first air injection well terminating in said aquifer, second blower means in flow communication along said second conduit for pumping atmospheric air into said vadose zone to urge said volatile contaminants toward said withdrawal well, and sepoarator means positioned in flow communication along said second conduit downstream of said second blower means, said separator means for removing oxygen from said atmospheric air prior to pumping of deoxygenated air into said aquifer.

2. Apparatus of claim 1 and means for neutralizing said volatile contminants positioned in flow communication along said first conduit downstream of said first blower means.

3. Apparatus of claim 1 and a third borehole terminating in said vadose zone, a third conduit positioned in said third borehole, and third pump means positioned along said third conduit for injecting air into said vadose zone.

4. Apparatus of claim 3 and a fourth conduit connecting said separator means and said third conduit, said fourth conduit constituting means for transferring said oxygen from said separator means into said third conduit for pumping to said vadose zone.

5. A method of removing volatile contaminants located below ground level, said method comprising the steps of:
(a) establishing a first borehole terminating in a vadose layer of contaminated earth;
(b) establishing a second borehole terminating in a below ground aquifer;
(c) placing first and second conduits in each respective borehole;
(d) placing first pumping means in flow communication along said first conduit for pumping air and volatile contaminants out of said first borehole;
(e) placing a second pumping means in flow communication along said second conduit for pumping air toeards the second borehole
(f) placing separator means in flow communication along said second conduit downstream of said second pumping means, said separator means for removing oxygen from atmospheric air prior to the air being pumped into said aquifer; and
(g) activating said first and second pumping means to pump deoxygenated air into said aquifer to urge said volatile contaminants toward said first borehole and to withdraw the contaminants through said first conduit.

6. The method of claim 5 and:
(h) operatively connecting said second blower means and said separator means and providing means for pumping the oxygen removed from said atmospheric air into the vadose layer to stimulate bacterial growth therein.

* * * * *